United States Patent [19]

Elter et al.

[11] Patent Number: 4,543,232
[45] Date of Patent: Sep. 24, 1985

[54] GAS COOLED HIGH TEMPERATURE REACTOR

[75] Inventors: Claus Elter, Bad Durkheim; Gerhard Noll, Mannheim; Josef Schoening, Hambruecken; Hans-Georg Schwiers, Ketsch; Wilfried Stracke, Oftersheim, all of Fed. Rep. of Germany

[73] Assignee: Hochtemperatur-Reaktorbau GmbH, Cologne, Fed. Rep. of Germany

[21] Appl. No.: 265,694

[22] Filed: May 20, 1981

[30] Foreign Application Priority Data

May 27, 1980 [DE] Fed. Rep. of Germany ....... 3020124

[51] Int. Cl.$^4$ .......................... G21C 11/08; G21C 11/06
[52] U.S. Cl. .................................... 376/289; 376/381; 376/353; 376/458
[58] Field of Search ............... 376/381, 382, 458, 353, 376/393, 394, 461, 287, 289, 293, 294, 347; 52/480, 484; 248/317

[56] References Cited

U.S. PATENT DOCUMENTS

| 2,993,850 | 7/1961 | Soodak et al. | 376/461 X |
| 3,100,187 | 8/1963 | Fraas | 376/381 X |
| 3,821,079 | 6/1974 | Jabsen | 376/294 X |
| 4,045,285 | 8/1977 | Baumguertner et al. | 376/394 X |
| 4,064,002 | 12/1977 | Desmarchais et al. | 376/282 |
| 4,092,216 | 5/1978 | Aubert | 376/353 |
| 4,118,276 | 10/1978 | Hodzic et al. | 376/393 |
| 4,175,001 | 11/1979 | Haferkamp et al. | 376/394 |
| 4,290,852 | 9/1981 | Fritz et al. | 376/381 |
| 4,295,620 | 10/1981 | LeClou | 376/461 X |
| 4,314,428 | 2/1982 | Bromwell | 52/480 X |

FOREIGN PATENT DOCUMENTS

| 2754087 | 6/1978 | Fed. Rep. of Germany | 52/484 |
| 2485591 | 12/1981 | Fed. Rep. of Germany | 52/484 |

*Primary Examiner*—Richard E. Schafer
*Assistant Examiner*—Daniel Wasil
*Attorney, Agent, or Firm*—Robert J. Koch

[57] ABSTRACT

A support structure for a nuclear reactor is disclosed comprising a primary support element connected with the roof of the pressure vessel and a secondary support element joined with the primary support element. The thermal roof shield and the roof reflector are connected to the secondary support element.

7 Claims, 4 Drawing Figures

GAS COOLED HIGH TEMPERATURE REACTOR

BACKGROUND OF THE INVENTION

1. Field of the Invention

The invention relates to a suspension arrangement for a roof reflector and thermal shield in a high temperature nuclear reactor. More particularly, the invention concerns the suspension arrangement for a roof reflector located above the reactor core and having a thermal roof shield over the roof reflector. The high temperature reactor is a gas cooled nuclear reactor utilizing spherical fuel elements.

2. Background of the Art

Gas cooled high temperature reactors are known. Typically, these reactors utilize a roof reflector and a thermal roof shield secured by means of a welded structure made of tubes, struts and anchors to the roof of the pressure vessel. The assembly and mounting of the welded structure, the reflector and the thermal shield is relatively expensive because of the numerous welded joints. Installation tolerances which must be equalized are accomplished only with difficulty.

SUMMARY OF THE INVENTION

It is, therefore, an object of the present invention to provide a suspension arrangement for a roof reflector and a thermal roof shield having relatively few fastening points on the roof of the reactor pressure vessel.

The active zone or core of the reactor consisting of a pile of spherical fuel elements is cooled typically by a flow of helium gas. The gas cooling circuit is one component of a dual circuit layout wherein the cooling medium and the working medium are separated from each other. The cooling gas circuitor primary circuit transfers thermal energy by means of a heat exchanger to the working medium of steam in the secondary circuit. The secondary circuit accomplishes the transformation of the thermal energy into electric energy and some of the thermal energy is also used as process heat.

The active zone or reactor core is surrounded directly by a reflector or neutron shield and a thermal shield. In the area above the active zone, the reflector and the thermal shield are fastened in a suspension arrangement on the roof of the pressure vessel.

The arrangements of these conventional components in various nuclear power plants are more completely disclosed in U.S. Pat. Nos. 4,045,285; 4,118,276 and 4,175,001, the disclosures of which are incorporated herein by reference.

The advantages obtained by the invention arise from the fact that the suspension may be, to a large extent, assembled from simple individual parts. Tolerances in height are readily equalized by means of the parts themselves. The structure of the roof of the pressure vessel remains largely unchanged, due to the relatively few fastening points. If the roof of the pressure vessel contains passages for the lined tubes for control rods, these passages will be used for the primary support or suspension element so that the pressure vessel roof remains undamaged.

The objects and advantages are achieved by a support structure comprising a primary support element connected with the roof of the pressure vessel and a secondary support element joined with the primary support element. The thermal roof shield and the roof reflector are connected to the secondary support element.

An advantageous further embodiment of the invention comprises a primary support element having a plurality of carrier plates secured to the roof of the pressure vessel by means of primary suspension bolts. The thermal roof shield and the roof reflector are suspended from these carrier plates by means of the secondary support element having secondary suspension bolts.

A further embodiment of the invention comprises a primary support element consisting of at least one liner for a control rod tube protruding through the roof of the pressure vessel, equipped at the protruding end with retaining rings. The thermal roof shield is held between the retaining rings and the roof reflector is in turn suspended from the thermal roof shield by means of the secondary support element comprising a plurality of suspension bolts arranged over the circumference of the thermal roof shield.

The primary and secondary suspension bolts in a preferred embodiment allow for equalization of height tolerances. Such bolts have threaded ends permitting fastening of bolts and the respective carrier plates, roof shield and roof reflector at the desired height or distance from one another. The primary suspension bolts are fastened to the roof of the vessel in a preferred embodiment by means of welds or threaded connection with the vessel liner.

In another preferred embodiment, the connection of the secondary support element to the control rod tube liners eliminates any need to disturb the vessel roof. Positioning of the retaining rings along the tube liner permits allowance for the height tolerances.

BRIEF DESCRIPTION OF THE DRAWINGS

Two examples of the invention are represented in the drawing and are described in more detail hereinafter.

In the drawing.

DETAILED DESCRIPTION OF EMBODIMENTS

Figure 1:
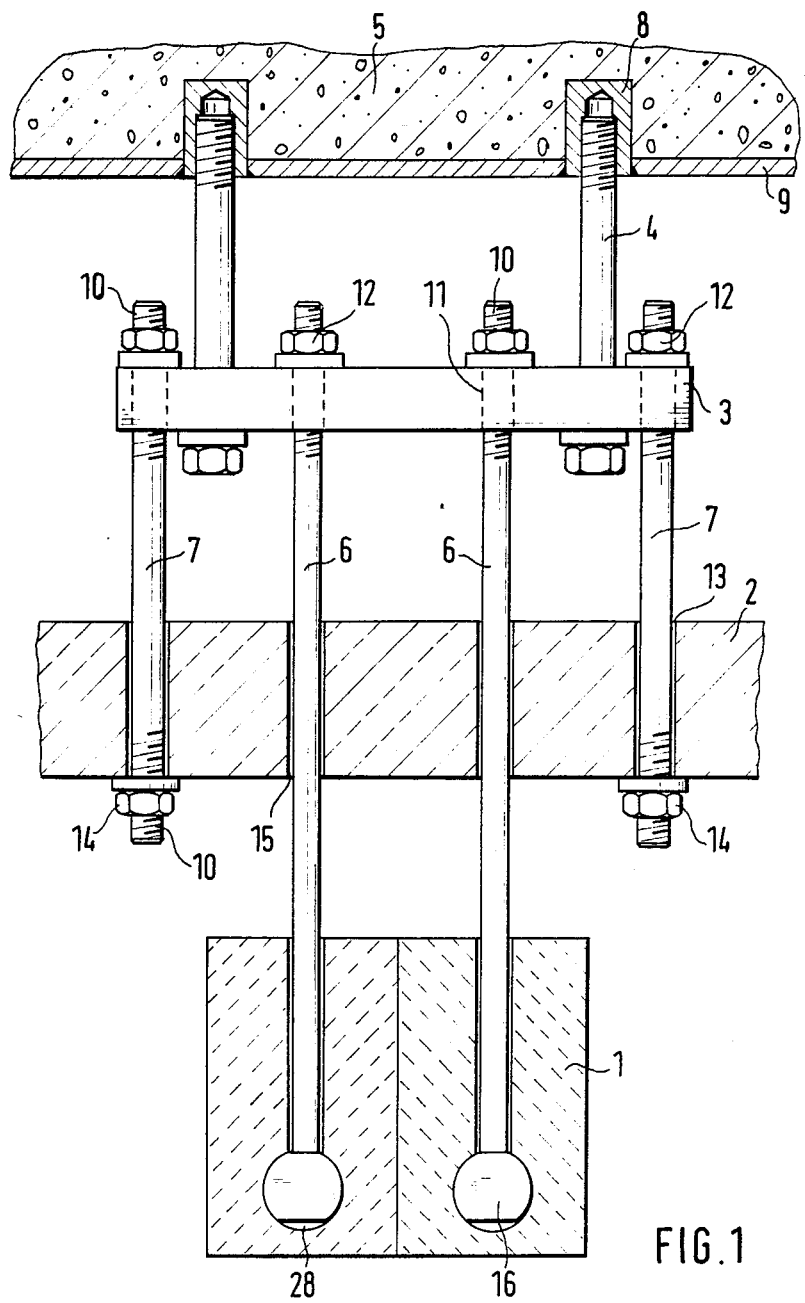
FIG. 1 shows a suspension of a roof reflector attached to a thermal roof shield arranged above the roof reflector.

The suspension arrangement for a roof reflector 1 and a thermal roof shield 2 is shown in FIG. 1. Carrier plate 3 is firstly secured to the roof 5 of the pressure vessel by means of the primary suspension bolts 4 and secondly equipped with secondary suspension bolts 6, 7 from which the roof reflector 1 and the thermal roof shield 2 are suspended. The primary suspension bolts 4 are screwed into the threaded sleeves 8 welded into the liner 9 of the pressure vessel roof 5. The secondary suspension bolts 6, 7 are equipped on both sides with a threading (not specifically shown but located generally at 10). These bolts are suspended in bores 11 of the carrier plate 3 and held by means of threaded nuts 12. The secondary suspension bolts 7 project in the bores 13 through the thermal roof shield 2, and are provided with threaded nuts 14. They thereby support the thermal roof shield.

The roof reflector 1 is suspended so that the secondary suspension bolts 6 are guided from the carrier plate 3, through the bores 15 in the thermal roof shield and screwed together with the transverse bolt 16 arranged in the roof reflector 1.

Figure 3:
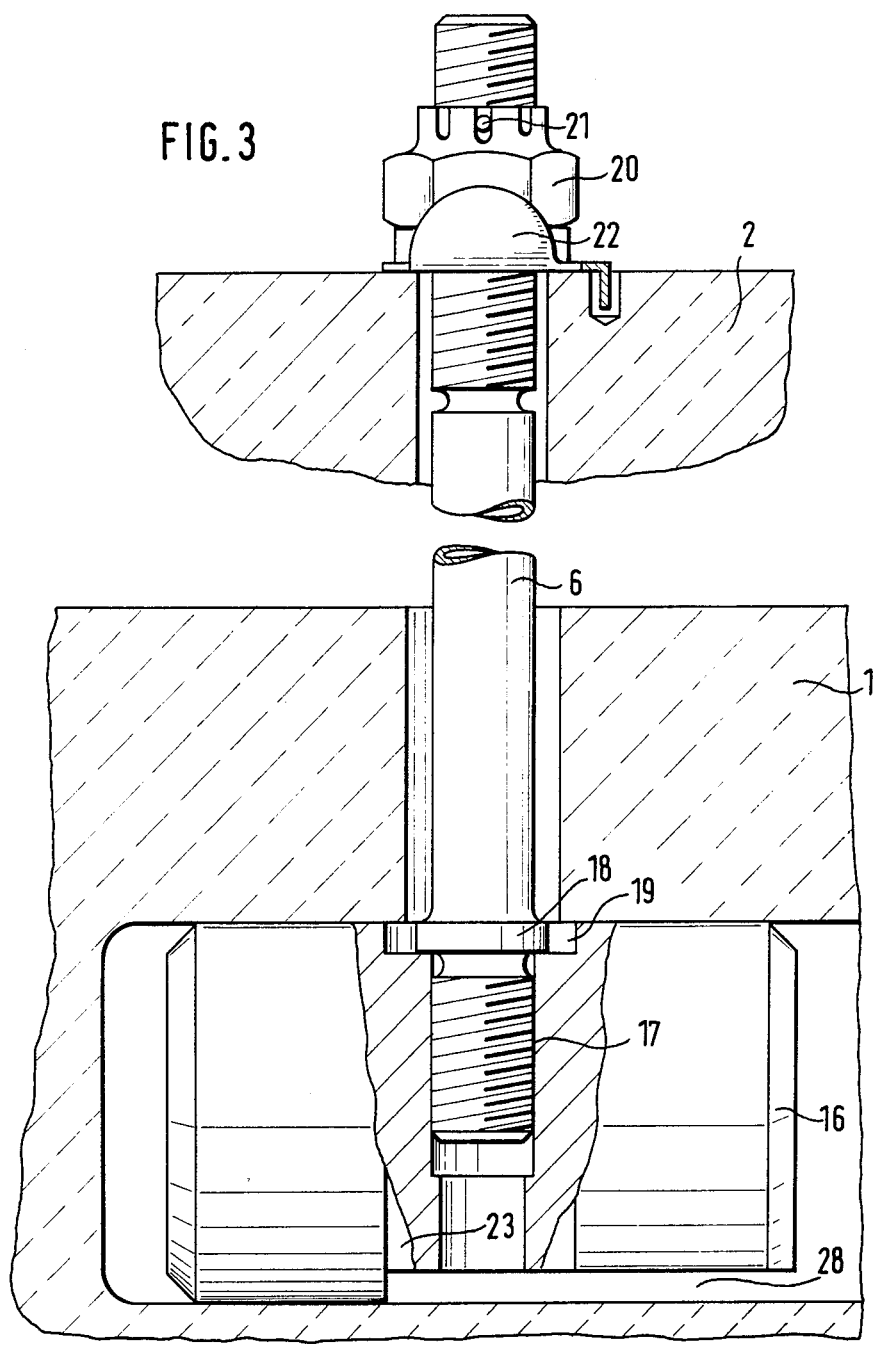
FIG. 3 illustrates a detail of the fastening of a suspension bolt.
Figure 4:
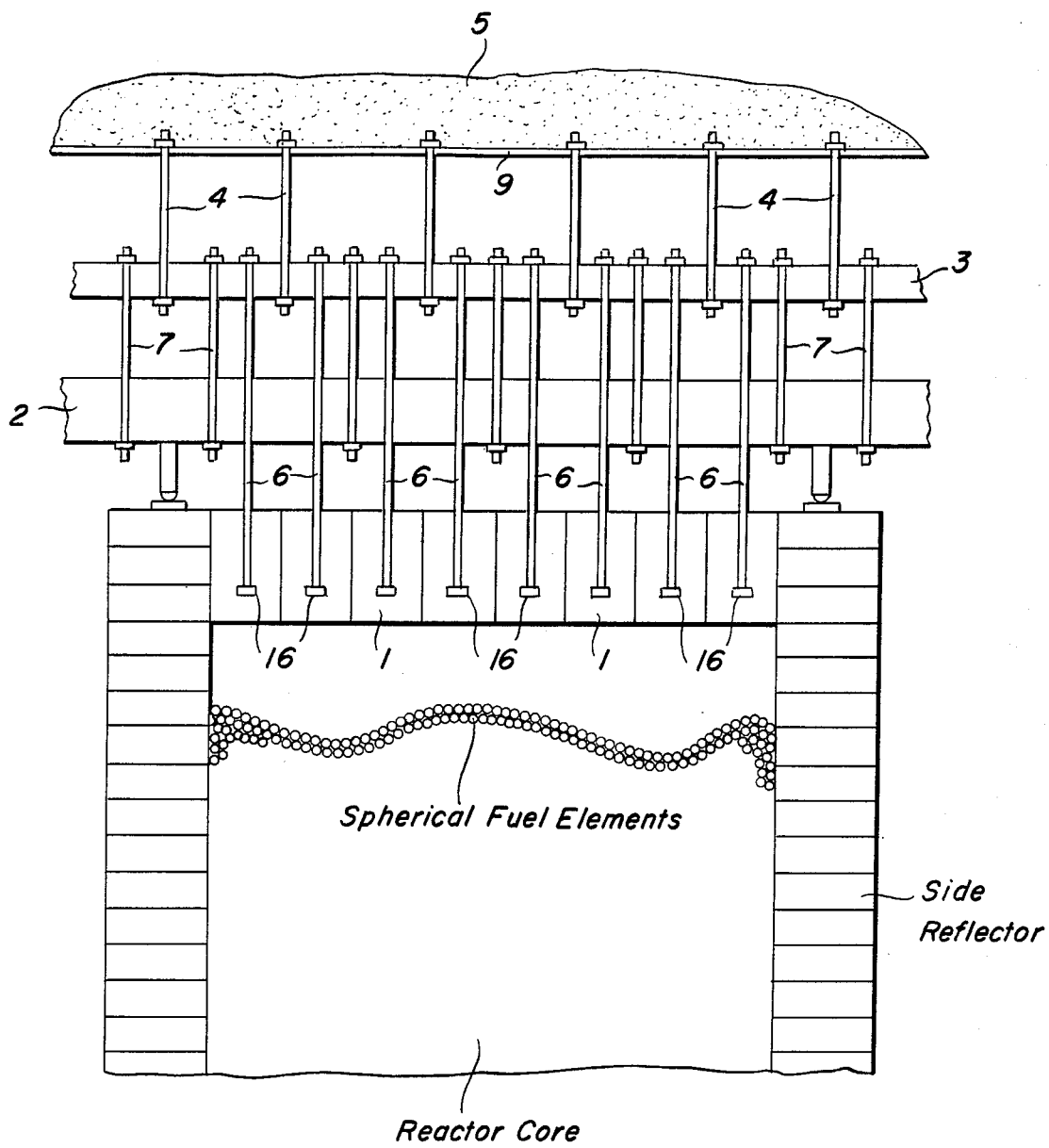
FIG. 4 illustrates a reactor core having a bed of spherical fuel elements.

The layout and fastening of the suspension bolts may be seen in detail in FIG. 3. In order to define the depth of the screwing of the suspension bolt 6 in the transverse bolt 16, the suspension bolt has a shoulder 18 above onset of its threading. To provide a flat abutment of said shoulder against the transverse bolt 16, the latter transverse bolt is equipped with a spot facing 19. A castle nut 20 is screwed onto the other end of the suspension bolt 6 and secured by means of a cotter pin. A locking plate 22 serves as an additional safety element.

For the conduction of the cooling gas, the suspension bolt 6 is a hollow construction whereby the cooling gas returns through an annular groove 23 in the transverse bolt 16 and a further hollow space 28 into the active zone or core of the reactor.

Figure 2:
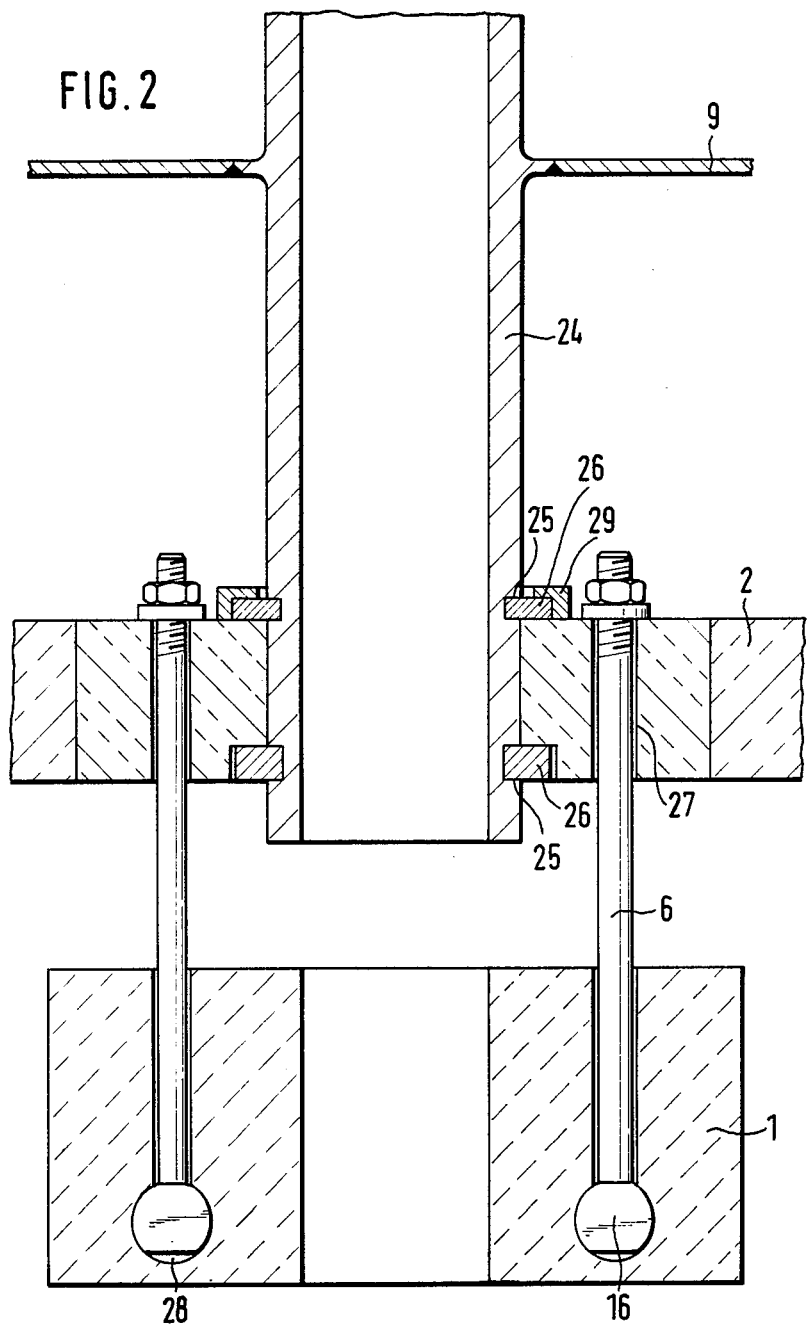
FIG. 2 demonstrates a suspension of a roof reflector secured to the free ends of the lined tube passages of the roof reflector and the thermal roof shield.

A further embodiment of the invention is seen in FIG. 2. Here grooves 25 are arranged on the free ends of the lined tube passages 24 projecting through the liner 9. The divided rings 26 are inserted with the thermal roof shield being held between such rings 26. With lock ring 29 which is screwed to the thermal roof shield, the rings 26 are immobilized in their position. The suspension of the roof reflector 1 is again effected by means of the suspension bolts 6, which in this case, are secured in the bores 27 arranged in the thermal roof shield 2, directly at the circumference of the lined tube passage 2.

The specification and drawings set forth preferred embodiments of the invention. It should be noted, however, that the invention is not limited to those specific embodiments and methods specifically disclosed, but extends instead to all embodiments, substitute and equivalent constructions falling within the scope of the invention as defined by the claims.

We claim:

1. A gas cooled high temperature nuclear reactor comprising:
    a pressure vessel having a vessel roof;
    a reactor core within said pressure vessel;
    a pile of spherical fuel elements in said reactor core;
    at least one primary support member extending from said vessel roof;
    a thermal roof shield supported from said primary support member;
    a plurality of graphite blocks forming a roof reflector above said pile of spherical elements;
    a plurality of primary suspension bolts extending from said primary support member connecting said plurality of graphite blocks wherein said suspension bolts are threaded at one end and are hollow to permit the flow of cooling gas therethrough.

2. The gas cooled high temperature nuclear reactor of claim 1 further comprising a plurality of secondary suspension bolts threaded at one end and fixedly attached to said primary support member, a carrier plate attached to said secondary suspension bolts wherein said carrier plate supports said thermal roof shield.

3. The gas cooled high temperature nuclear reactor of claim 2, wherein said plurality of said secondary suspension bolts are bolted at said threaded end to said carrier plate.

4. The gas cooled high temperature nuclear reactor comprising:
    a pressure vessel having a vessel roof;
    a reactor core within said pressure vessel;
    a pile of spherical fuel elements in said reactor core;
    at least one primary support member extending from said vessel roof;
    a thermal roof shield supported from and attached to said primary support member;
    a plurality of graphite blocks forming a roof reflector above said pile of spherical elements; and
    a plurality of primary suspension bolts extending from said thermal roof shield connecting said plurality of graphite blocks wherein said suspension bolts are threaded at one end and are hollow to permit the flow of cooling gas therethrough.

5. The gas cooled high temperature nuclear reactor of claim 4, wherein said primary support member is a control rod liner tube.

6. The gas cooled high temperature nuclear reactor of claim 5, wherein said control rod liner tube supports said thermal roof shield between ring members inserted in grooves in said control rod tube liner.

7. The gas cooled high temperature nuclear reactor of claim 1 further comprising transverse bolts in said roof reflector and attached to said primary suspension bolts.

* * * * *